United States Patent
Boulé

(10) Patent No.: US 6,546,641 B1
(45) Date of Patent: Apr. 15, 2003

(54) DEVICE FOR GUIDING THE CUTTING OF AN OPENING IN A WALL

(76) Inventor: Martin Boulé, 7 Parc Burgoyne, Léry, Québec (CA), J6N 1H1

( * ) Notice: Subject to any disclaimer, the term of this patent is extended or adjusted under 35 U.S.C. 154(b) by 0 days.

(21) Appl. No.: 10/059,996

(22) Filed: Jan. 29, 2002

(51) Int. Cl.[7] .............................. B25H 7/02; G01B 5/14
(52) U.S. Cl. .................................. 33/528; 33/DIG. 10
(58) Field of Search .......................... 33/528, DIG. 10, 33/613, 626, 627, 628, 638, 640, 645, 666, 427, 474, 479, 483, 484, 485, 464, 465, 473

(56) References Cited

U.S. PATENT DOCUMENTS

| | | |
|---|---|---|
| 3,888,013 A | 6/1975 | Benoit |
| 3,924,331 A | 12/1975 | Goosen |
| 4,054,396 A * | 10/1977 | Cassidy ................. 33/DIG. 10 |
| 4,059,907 A | 11/1977 | Dauber |
| 4,126,941 A | 11/1978 | Clarke |
| 4,259,785 A | 4/1981 | Wortham |
| 4,576,431 A | 3/1986 | Thayer |
| 4,696,113 A | 9/1987 | Rice ............................ 33/562 |
| 4,730,395 A | 3/1988 | Blessing, Sr. |
| 4,951,395 A | 8/1990 | Lameiro |
| 4,969,269 A | 11/1990 | Dominguez |
| 5,111,593 A | 5/1992 | Gehen, Sr. ..................... 33/613 |
| 5,222,303 A | 6/1993 | Jardine .......................... 33/528 |
| 5,491,902 A | 2/1996 | Uhrin et al. .................. 33/563 |
| 5,615,490 A * | 4/1997 | Burchell ....................... 33/528 |
| 5,630,281 A | 5/1997 | Pledger et al. ................ 33/528 |
| 5,692,357 A * | 12/1997 | McCain ........................ 33/528 |
| 5,797,189 A | 8/1998 | Gilbert |
| 5,813,130 A | 9/1998 | MacDowell ................. 33/528 |
| 5,860,219 A | 1/1999 | Wilkinson ................... 33/528 |
| 5,966,828 A | 10/1999 | Hickey ......................... 33/528 |

FOREIGN PATENT DOCUMENTS

GB 2248035 3/1992

* cited by examiner

Primary Examiner—Christopher W. Fulton
(74) Attorney, Agent, or Firm—Merchant & Gould P.C.

(57) ABSTRACT

A device for positioning and guiding the cutting of an opening on a wall. The device comprising a positioner interconnected to a cutting template. The positioner is designed to accurately positioning the cutting template at the appropriate position on the wall. The cutting template is designed to guide the cutting of the opening in the wall. The cutting template is secured to the positioner so as to be rotatable around a central axis. A method and a kit for positioning and cutting an opening on a wall is also provided.

23 Claims, 7 Drawing Sheets

(a)

(b)

(c)

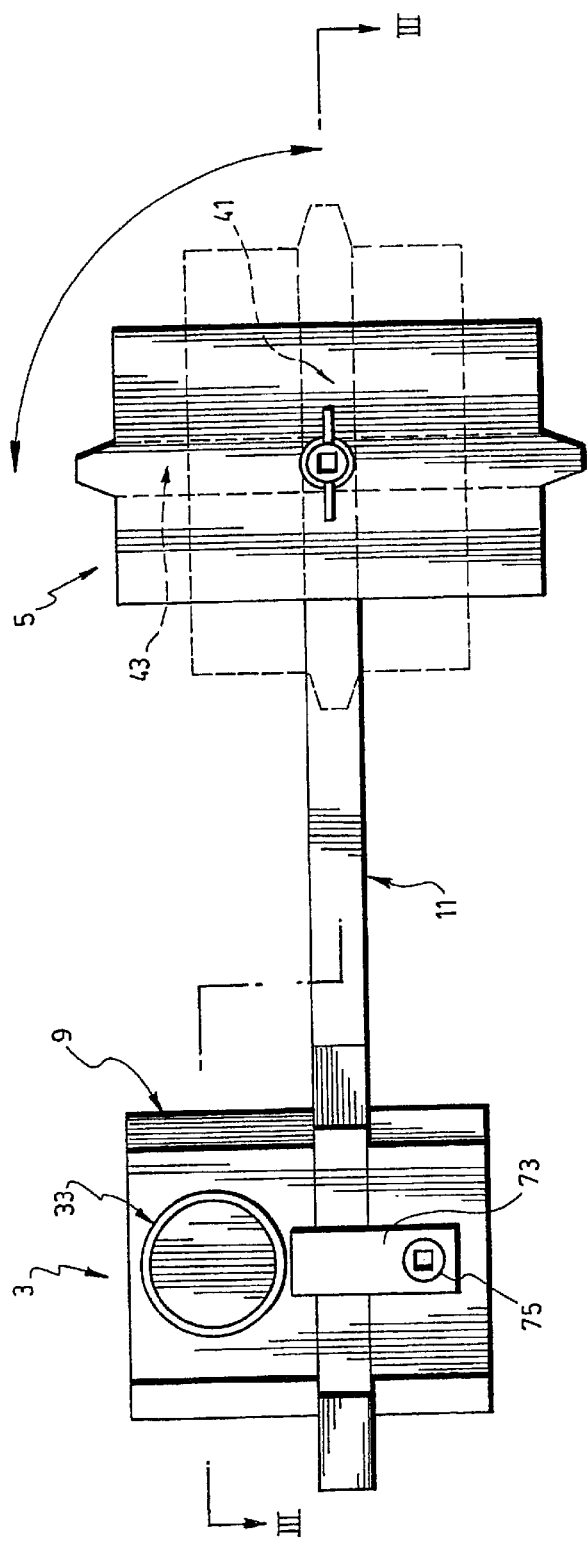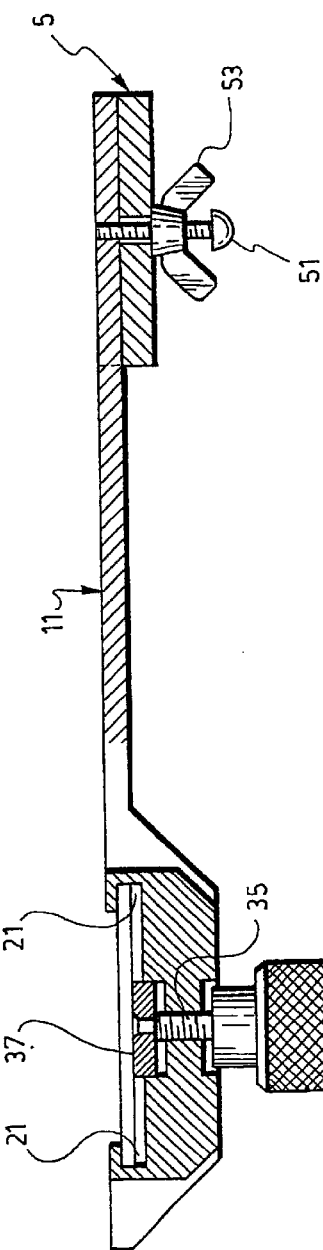
FIG. 2
FIG. 3

DEVICE FOR GUIDING THE CUTTING OF AN OPENING IN A WALL

FIELD OF THE INVENTION

The present invention relates to a device for positioning and guiding the cutting of an opening in a wall.

BACKGROUND OF THE INVENTION

Several tools and devices are used for measuring and cutting an opening on a wall. The standard methods of cutting such an opening require the use of several tools and a series of steps when using the various tools. For instance, the location of the opening relative to the side edge and bottom edge of the wall is first measured with a ruler. Then the measurements are transcribed to the paneling where the opening is to be cut. Once the location is marked on the paneling the opening is traced thereon with a stencil and the opening is cut according to the marking. These steps are repeated for every single opening to be cut even when the only change is in the size of the opening or in the vertical or horizontal position of the opening (see FIG. 1A). Thus, such procedures are tedious, since they require several steps prior to the final cutting step of the opening in the wall.

U.S. Pat. No. 5,860,219 is concerned with a device comprising a template for cutting an opening, the template being slidably secured on a ruler such as a wallboard's square or a carpenter's square. The template slides along the long member of the wall board's square to position and install the outlet boxes according to the building specifications. The template is then used to accurately position the corresponding wallboard, sheeting or paneling. This step is repeated for every single opening to be cut.

U.S. Pat. No. 4,696,113 is concerned with a device for locating an accessory with respect to a vertical wall stud so that an opening can be cut in a panel or a sheet of dry wall to accommodate the accessory before the panel is attached to the wall.

As can be noted, the devices that are known and used to this day require several steps of measuring the opening's location, transcribing the measurements on a paneling, tracing the outline of the opening with a stencil and cutting the opening on the marked paneling. These steps are needed for the cutting of every-single opening, even for openings having the same position but differing only in the shape or orientation of the opening (as seen in FIG. 1A).

Therefore, there is a need for providing a tool that overcomes most of the inconvenience encountered with the use of standard tools and methods for cutting an opening on a planar surface.

SUMMARY OF THE INVENTION

An object of the present invention is to provide a device that would overcome most of the above-addressed problems.

Another object of the present invention is to provide a device that simplifies the cutting of an opening on a surface.

A further object of the present invention is to provide a device that is versatile in that it allows the cutting of an opening in different orientations without requiring carrying out the initial steps of measuring, transcribing and tracing the position of the opening.

More precisely, in accordance with the present invention, there is provided a device for positioning and cutting an opening in a surface, the device comprising:

a positioner with a main axis, mountable on a ruler in a sliding relationship with the same along a direction parallel to the main axis; and a cutting template interconnected to the positioner so as to be movable with the same, for guiding the cutting of the opening in the wall, the cutting template being selectively rotatable between a first position where a longitudinal axis of the same is parallel to the main axis of the positioner and a second position where said longitudinal axis is at right angle with the main axis.

The present invention is also concerned with a method for positioning and cutting an opening in a wall for an electric box, the method comprising the steps of:

a) measuring the vertical and horizontal positions of the electric box;

b) providing a device having a positioner and a cutting template according to the present invention;

c) mounting the positioner of the device of step b) on a ruler the positioner being mounted on the ruler at the vertical position measured in step a);

d) positioning the cutting template of the device of step c) at the horizontal position as measured in step a); and e) cutting the opening around the cutting template of the device of step b).

A kit for measuring and guiding the cutting of an opening in a wall is also provided in accordance with the present invention. The kit comprises:

a positioner with a main axis, mountable on a ruler in a sliding relationship with the same along a direction parallel to the main axis ; and a cutting template interconnected to the positioner so as to be movable with the same, for guiding the cutting of the opening in the wall, the cutting template being selectively rotatable between a first position where a longitudinal axis of the same is parallel to the main axis of the positioner and a second position where said longitudinal axis is at right angle with the main axis.

An advantage provided by the device of the present invention is that it allows easy positioning and cutting of an opening on a wall in one or different orientation as the device comprises a component viz the cutting template that is adapted to rotate between different positions around a central axis thereby allowing the cutting template to be adjustable between a vertical position and a transversal position.

The present invention and its advantages will be more easily understood upon reading the following non-restrictive description of the preferred embodiment thereof, made with reference of the following drawings.

BRIEF DESCRIPTION OF THE DRAWINGS

FIG. 2 is a front view of the device of FIG. 1.

FIG. 3 is a top view of the device of FIG. 1.

DETAILED DESCRIPTION OF THE INVENTION

Figure 1:
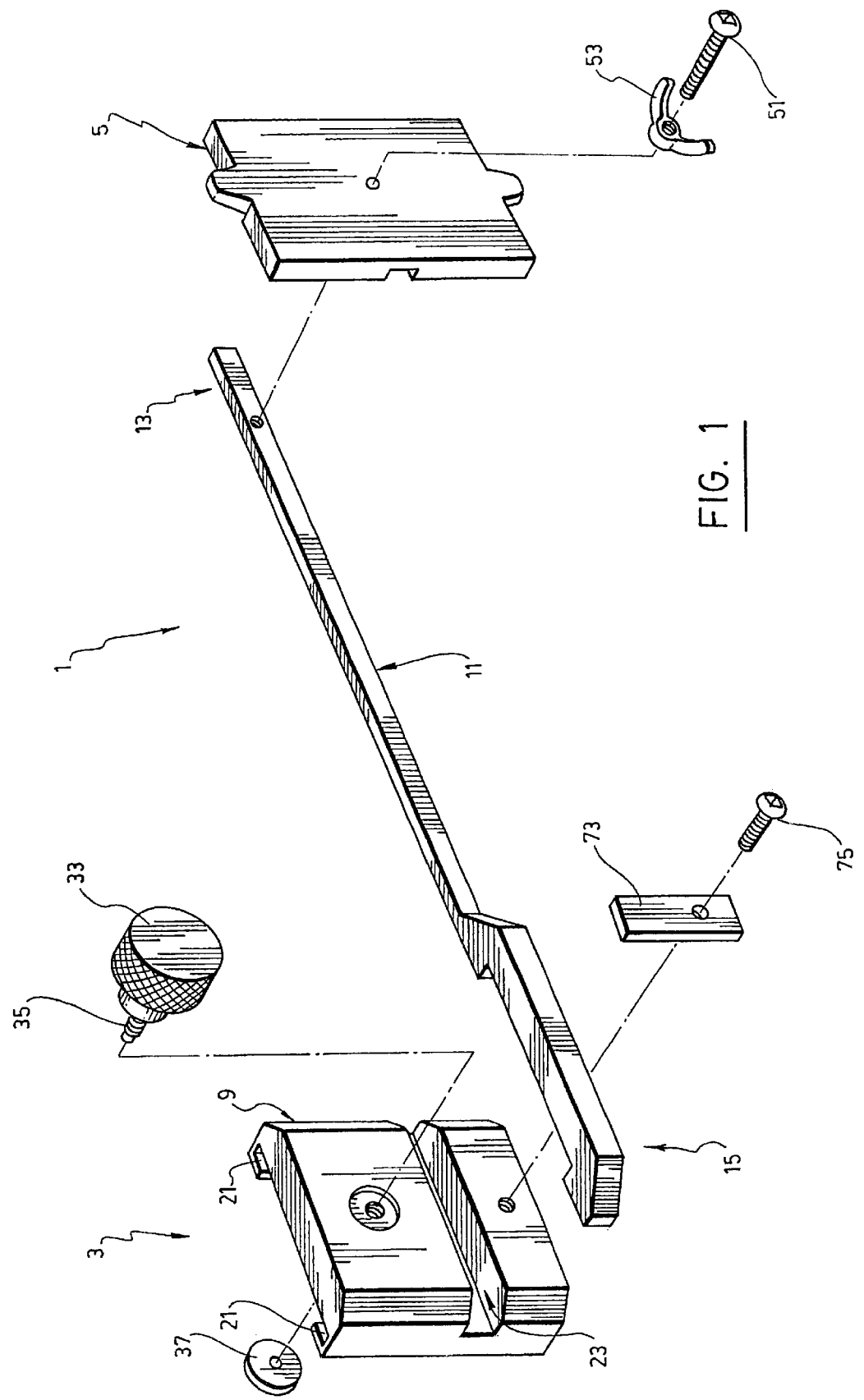
FIG. 1 is an exploded perspective view of a device according to a preferred embodiment of the present invention.
Figure 1A:
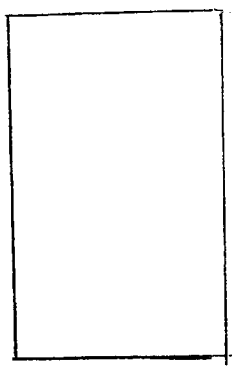
FIG. 1A is a schematic representation of a vertical opening (a), a horizontal opening (b) and an enlarge opening (c).
Figure 1A:
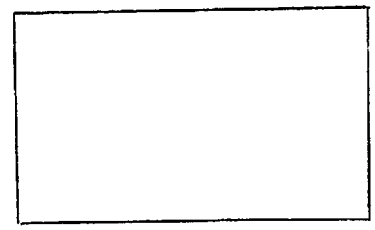
Figure 1A:
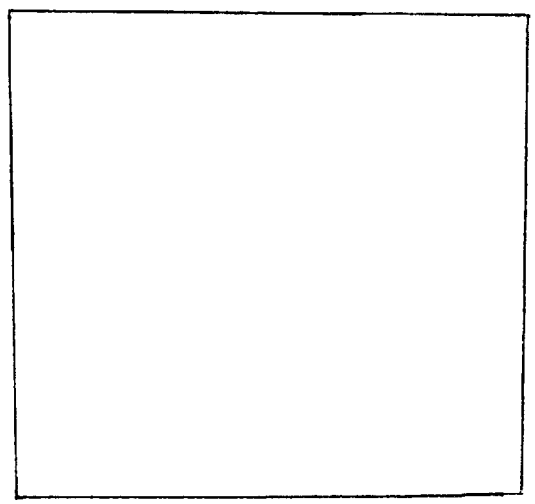

As shown in FIG. 1, the present invention is concerned with a device used for guiding the cutting of an opening on a wall. According to the present invention, the wall may be any planar structure or surface such as a sheeting or a paneling. The device comprises a positioner 3 interconnected to a cutting template 5.

The positioner 3 is used for positioning the cutting template 5 at the right position so as to allow the cutting of an opening in the wall. The positioner 3 has a main axis and is mountable on a ruler 71 in a sliding relationship with the same along a direction parallel to the main axis.

In accordance with the present invention, the positioner 3 comprises a guide 9 and a connector.

The connector includes a rod 11 having a first 13 and a second ends 15. The first 13 end is connected to the cutting template 5 and the second end 15 is connected to the guide 9. The rod 11 extends along an axis perpendicular to the main axis of the positioner 3. The rod 11 is detachably mounted on the guide 9. In use, the rod 11 may be disconnected from the guide 9 to allow separate use of the ruler 71 as a template for cutting the wall in a definite length. Furthermore, the fact that the connector 11 is readily detachable from the guide 9 allows the cutting template 5 to be reversibly mounted on the right or the left side of the guide 9. This in turn allows the cutting of an opening near the left or right edge of the wall.

The guide 9 has a front and a back face. The back face comprises a pair of longitudinal brackets 21 protruding from the back face and is adapted to receive a ruler 71 in a sliding relationship. The guide 9 is also designed to be connected to the connector. In the illustrated embodiment, the guide 9 comprises at the front face, a horizontal groove 23, which is perpendicular to the main axis. This horizontal groove 23 is adapted for removably receiving the second end 15 of the connector.

The guide 9 may further comprise a stopper 31 for holding the positioner 3 in a fixed position on the ruler. As can be seen in FIG. 1, the stopper 31 extends throughout the guide 9 and comprises a head 33 extending out from the front face of the guide, a threaded body 35 extending throughout the guide and a foot 37 extending from the back face of the guide 9 and adapted to abut against the ruler for holding the guide 9 in place. Any other structural embodiments that would allow the positioner to be firmly secured to the ruler may be used in the context of the present invention.

The guide 9 may further comprise a connector lock for securing the second end 15 of the connector to the front face of the guide 9. As seen in FIGS. 1 and 2, the connector lock may be a lever 73. The lever 73 may be mounted on the guide 9 with a screw 75. Again, any locking device may be used in the context of the present invention.

As can be further seen in FIGS. 1 and 2, the cutting template 5 of the present invention has a rectangular shape. However according to the present invention, the cutting template 5 may have any other shape conforming to the shape of the opening required for example, the cutting template could be circular, triangular, etc.

According to the illustrated embodiment as shown in FIGS. 1 and 2, the cutting template 5 has a front and back faces. The back face comprises at least one groove for receiving the first end of the positioner's connector. As best seen in FIG. 2, the back face comprises a longitudinal groove 41 parallel to the longitudinal axis of the latter and a transversal groove 43, which is perpendicular to the longitudinal groove 41. The longitudinal and transversal grooves 41, 43 are adapted to selectively receive the first end 13 of the connector for selectively positioning the cutting template 5 in a first or second position, for example in a vertical or horizontal position.

As best seen in FIGS. 1 and 3, the cutting template 5 further comprises an attaching means for securing the first end 13 of the connector to the cutting template 5. The attaching means may be any structural embodiment that would secure the connector to the cutting template 5. It is worth noting that any other fastening means or structural embodiment known in the art could be used. According to a preferred embodiment, the attaching means comprises a screw 51 and a wing nut 53.

Figure 4:
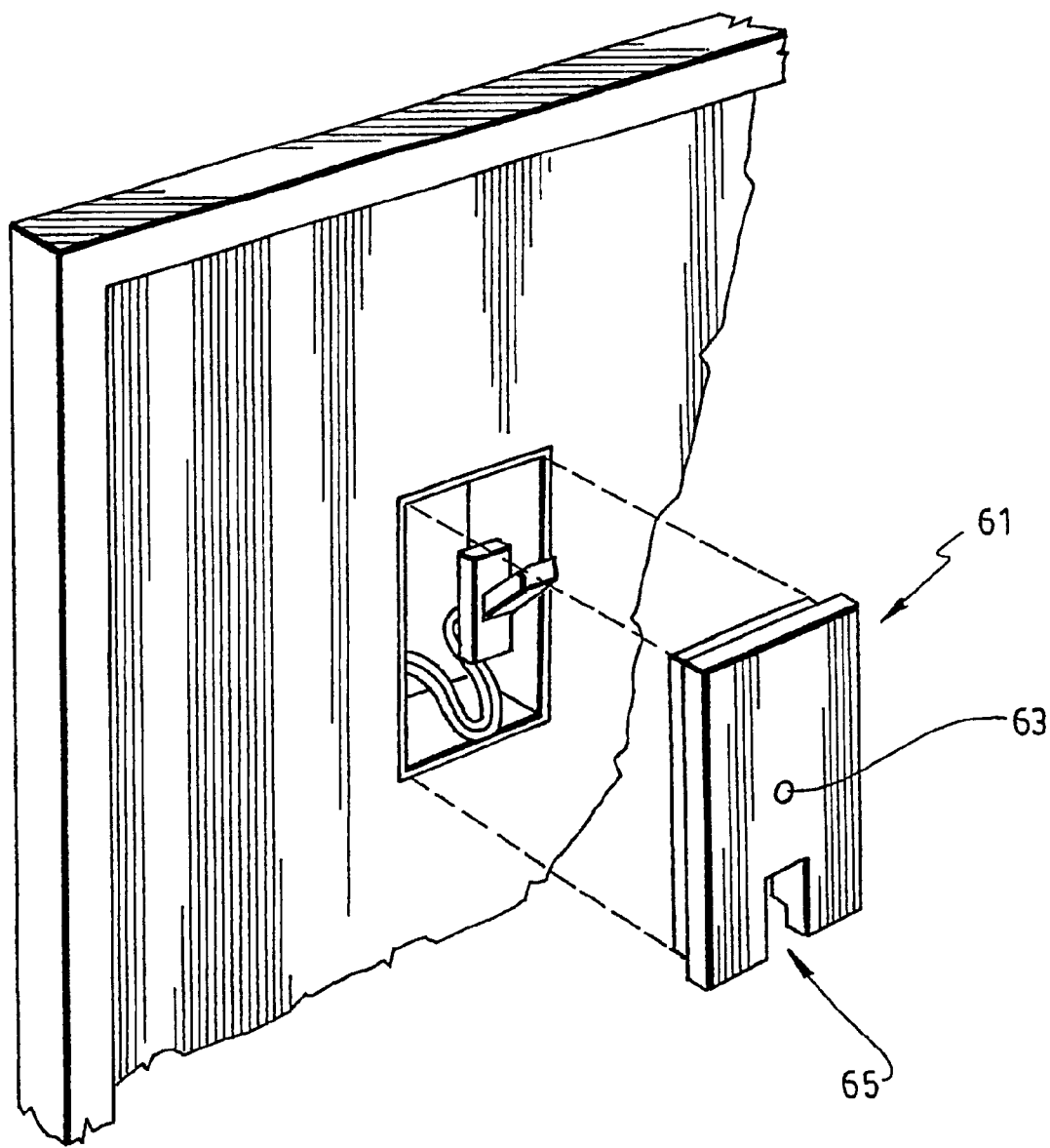
FIG. 4 is a perspective view of a measuring plate of the device of FIG. 1 to be installed in an electrical outlet.
Figure 5:
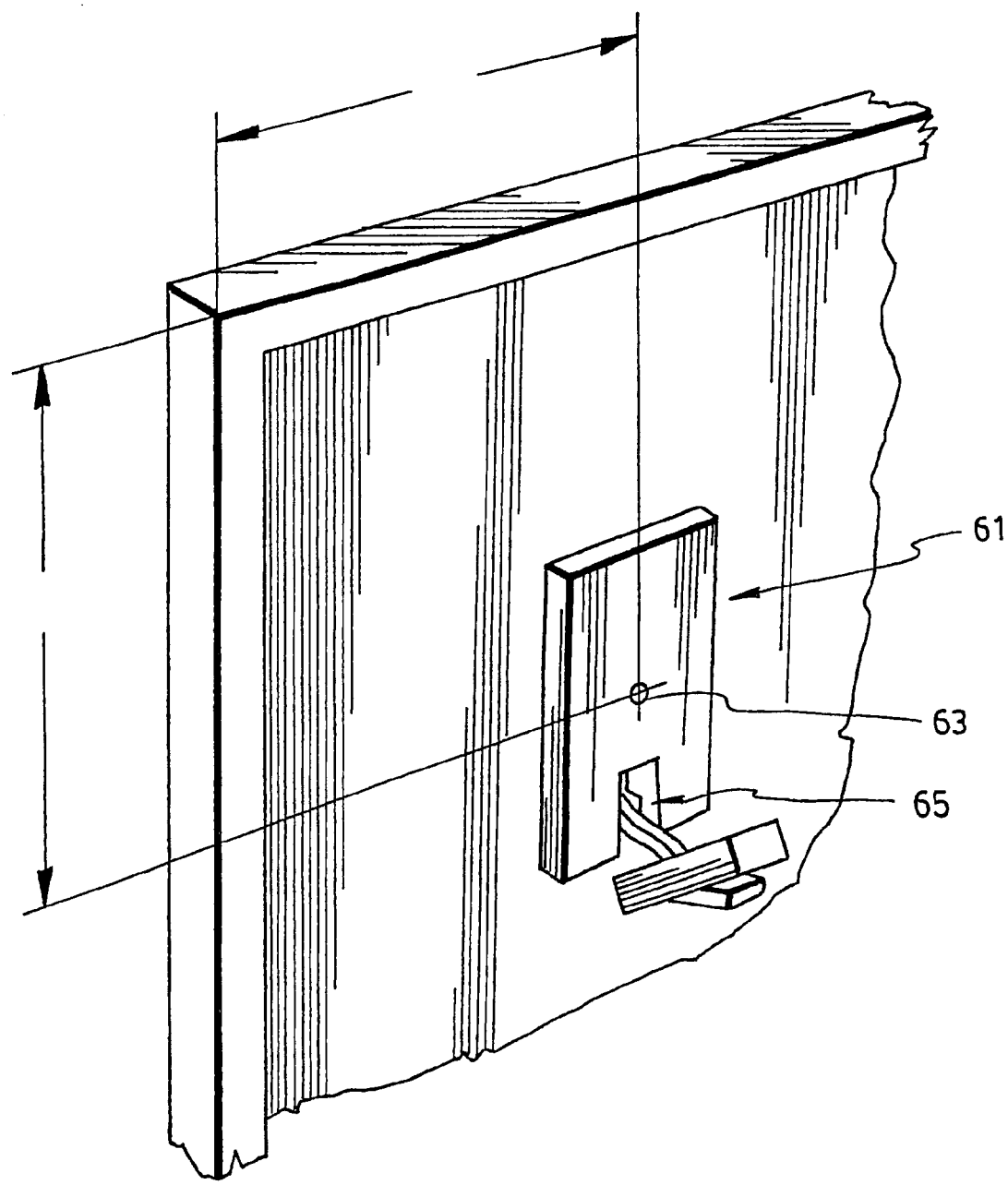
FIG. 5 is a perspective view of the measuring plate of FIG. 4 installed in the electrical outlet.
Figure 6:
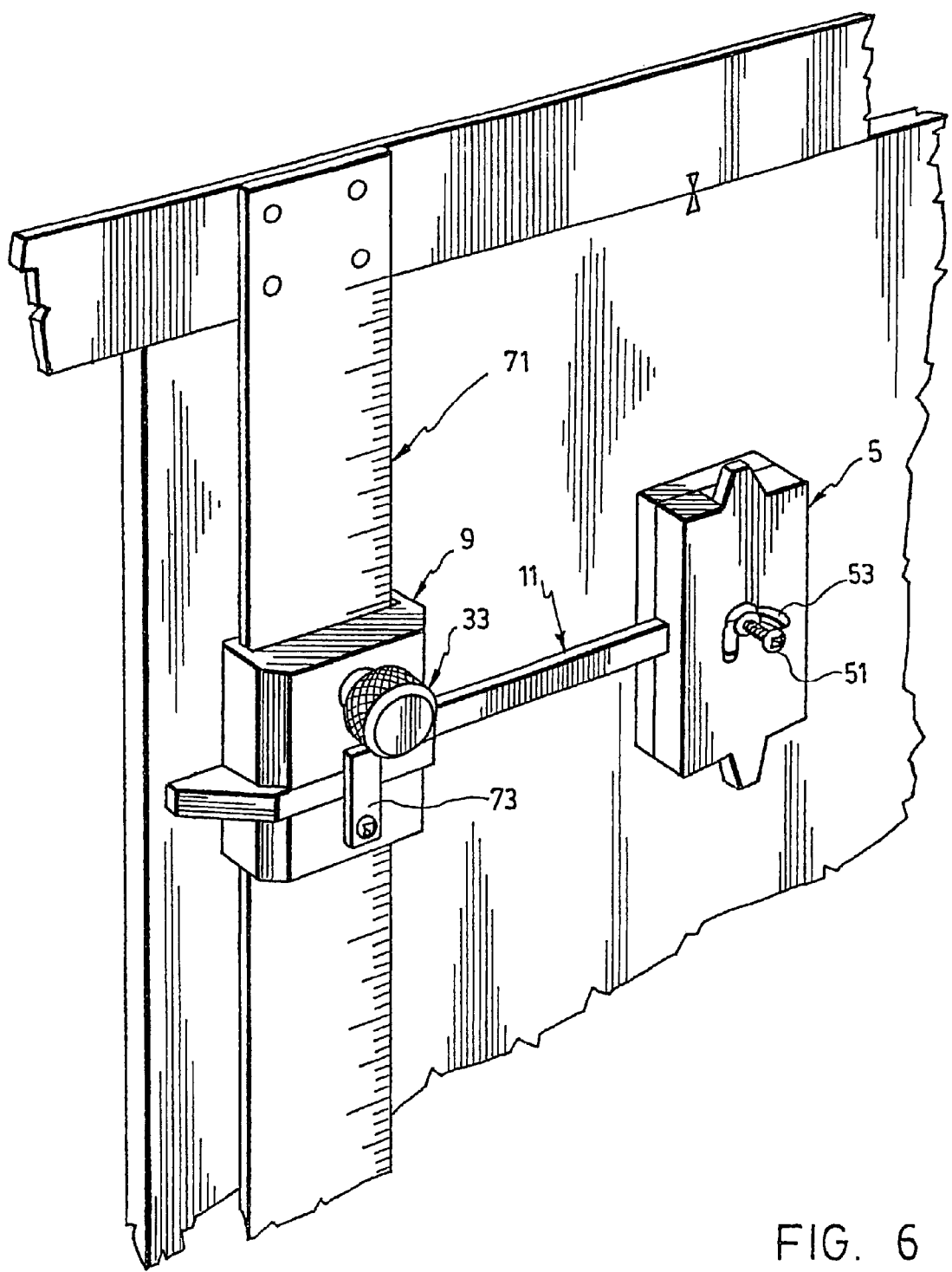
FIG. 6 is a perspective view of the device of FIG. 1 mounted on a plasterboard ruler.
Figure 7:
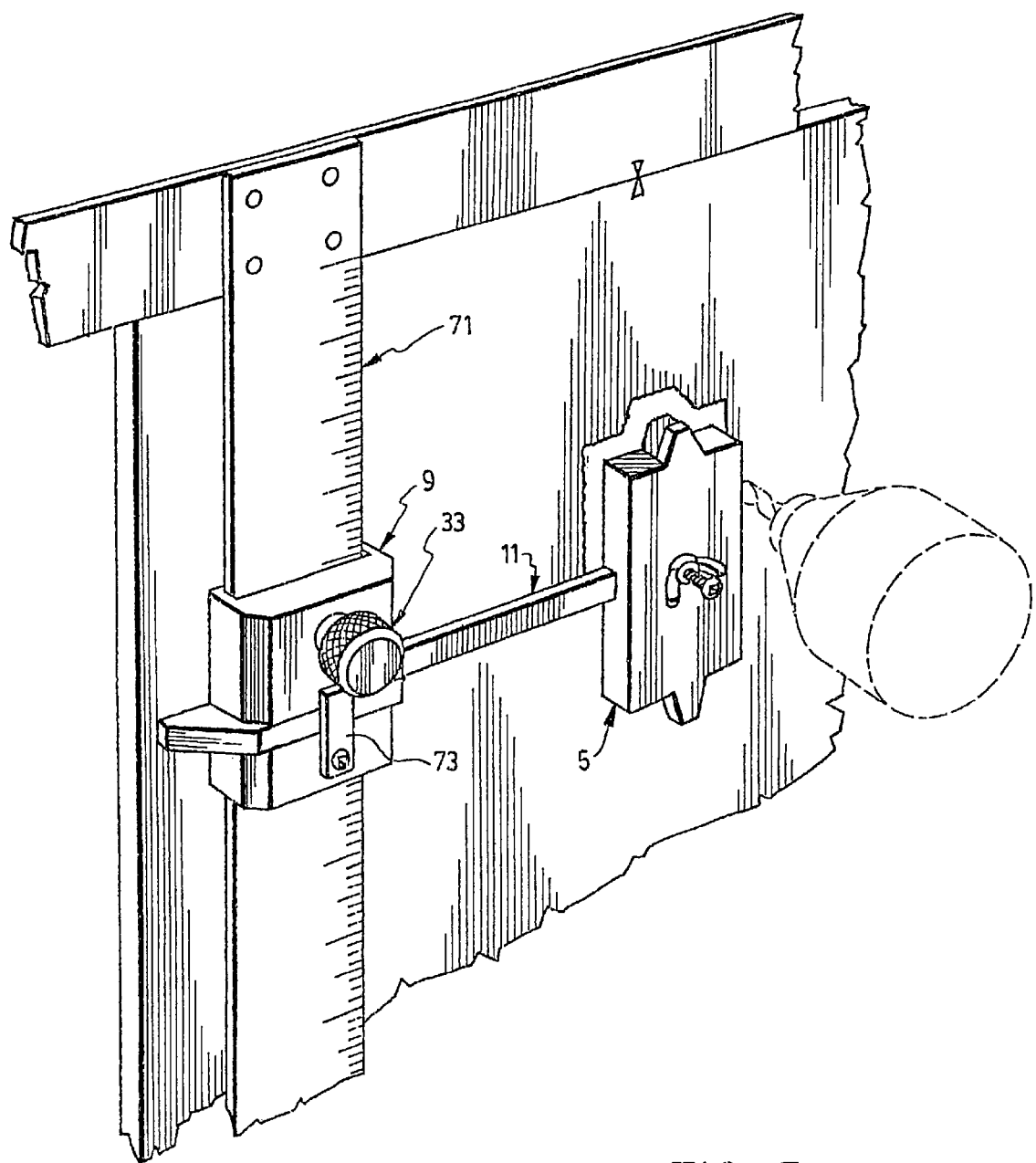
FIG. 7 is a perspective view of the device of FIG. 1 mounted on a plasterboard ruler and guiding the cutting of the opening on a wall.

Referring now to FIGS. 4 and 5, it is shown that according to a preferred embodiment of the present invention, the device may further comprise a measuring template 61. The measuring template 61 of the present invention is especially designed to allow the user to rapidly locate the center of the opening to be made. The measuring template comprises a point of reference in its center for measuring and positioning the cutting template 5 at a predetermined position on the wall. In use, the vertical position is measured from the bottom or top edge of the wall to the centered point of reference and the horizontal position is measured from the side edge of the wall to the centered point of reference. According to the illustrated embodiment, the point of reference is an opening 63.

Preferably, the measuring template 61 may be adapted to fit in an electrical box in a snap-fit fashion. In this case, the measuring template 61 has on its back face four side edges, each of which are beveled.

Also preferably, the measuring template 61 may also comprise a notch 65 at the bottom edge thereof for creating a wiring space.

As mentioned hereinabove, the present invention is also concerned with a method for positioning and guiding the cutting of an opening in a wall for an electric box. The first step consists of measuring the position of the electric box. In accordance with the present invention, this can be done by measuring the vertical and horizontal positions of the electric box with a ruler 71. Alternatively, the position may be measured by using the measuring plate 61 as shown in FIGS. 4 and 5 and as described hereinabove. The use of such measuring plate 61 provides a further advantage of allowing rapid and precise positioning of the cutting template 5.

When using a measuring template 61, first the horizontal distance, which extends from the side edge of the wall to the centered point of reference 63 of the measuring template 61, is calculated. Second, the vertical distance, which extends either from the bottom or the top edge of the wall to the centered point of reference 63 is calculated.

The second step is to secure the positioner 3 and more precisely, the guide 9 of the device of the present invention on a ruler according to the vertical position measured in the previous step. Once the device is mounted on the ruler, the device is placed at the appropriate horizontal position on the wall with the help of the top horizontal ruler of the wall board's ruler. Alternatively, the horizontal position may be first marked on the wall and the cutting template 5 may then be aligned to the marked position.

Finally the opening may be cut around the cutting template 5.

As can be noted, the use of the device of the present invention provides a further advantage in that it does not require the tracing of the opening on the wall prior to the cutting of the opening. Further, as previously mentioned, the fact that the connector is detachable from the guide and that the cutting template is movable around a central axis allows the device of the present invention to be a lot more versatile than the tools known to this day. These features allow the cutting of an opening on different sides of the wall and even in different orientation (for instance vertical or horizontal) without requiring the measuring, positioning and tracing of the device on the ruler and on the wall.

A kit for measuring and guiding the cutting of an opening on a surface is also provided according to the present invention. The kit comprises a positioner with a main axis, mountable on a ruler in a sliding relationship with the same along a direction parallel to a main axis. The kit also comprises a cutting template interconnected to the positioner so as to be movable with the same. The cutting template is selectively rotatable between a first and second position. In the first position, the cutting template is in the same direction with the main axis and in the second position, the cutting template is transversal with the main axis.

The kit may preferably comprise a measuring template and/or a ruler such as a wallboard's ruler or a carpenter's square.

It should be understood that according to a preferred embodiment of the invention, the positioner, cutting template and measuring template of the kit may be as defined herein above.

The positioner and the cutting template may be made of a metal selected from the group consisting of aluminum and steel.

It is apparent that many modifications and variations of this invention as herein before set forth may be without departing from the spirit and scope thereof. The specific embodiments described are given by way of example only and the invention is limited only by the terms of the appended claims.

I claim:

1. A device for positioning and cutting an opening in a wall, the device comprising:
   a positioner with a main axis, mountable on a ruler in a sliding relationship with the same along a direction parallel to the main axis; and
   a cutting template interconnected to the positioner so as to be movable with the same, for guiding the cutting of the opening in the wall, the cutting template being selectively rotatable between a first position where a longitudinal axis of the same is parallel to the main axis of the positioner and a second position where said longitudinal axis is at right angle with the main axis.

2. A device according to claim 1, wherein the positioner comprises a guide and a connector.

3. A device according to claim 2, wherein the connector includes a rod having a first and a second ends, the first end being connected to the cutting template and the second end being connected to the guide, the rod extending along an axis perpendicular to the main axis of the positioner.

4. A device according to claim 3, wherein the guide has a front and a back face, the back face being adapted to receive the ruler.

5. A device according to claim 4, wherein the guide comprises a pair of longitudinal facing brackets protruding from the back face of the guide for receiving the ruler in a sliding relationship.

6. A device according to claim 5, wherein the guide comprises on the front face, a horizontal groove perpendicular to the main axis for removably receiving the second end of the connector.

7. A device according to claim 3, comprising a stopper for holding the guide in a fixed position on the ruler, the stopper extending throughout the guide and comprising:
   a head extending out from the front face of the guide;
   a threaded body extending throughout the guide; and
   a foot extending out from the back face of the guide and adapted to abut against the ruler for holding the guide.

8. A device according to claim 3, wherein the cutting template comprises a front and a back face, the back face being adapted to receive the first end of the connector.

9. A device according to claim 3, wherein the back face of the cutting template comprises a longitudinal groove parallel to the longitudinal axis of the same and a transversal groove which is perpendicular to the longitudinal groove of the cutting template, the longitudinal and transversal grooves being adapted to selectively receive the first end of the connector for selectively positioning the cutting template in the first position or second position.

10. A device according to claim 9, wherein the measuring plate further comprises a back face having four sides, each of said side is bevelled so to allow the measuring plate to fit in an electrical box in a snap-fit fashion.

11. A device according to claim 3, wherein the cutting template further comprises a fastening means for fastening the first end of the connector to the cutting template.

12. A device according to claim 11, wherein the fastening means is a screw and a wing nut.

13. A device according to claim 1, further comprising a measuring plate for measuring a predetermined position of the opening, the measuring plate comprising a centered point of reference.

14. A device according to claim 13, wherein the centered point of reference of the measuring plate is an opening.

15. A device according to claim 14, wherein the measuring plate comprises a notch at a bottom edge for creating a wiring space.

16. A method for positioning and cutting an opening in a wall for an electric box, the method comprising the steps of:
   a) measuring the vertical and horizontal positions of the electric box relative to the side and bottom or top edges of a wall;
   b) providing a device comprising a positioner and a cutting template as in claim 1;
   c) mounting the positioner of the device of step b) on a ruler according to the vertical position measured in step a);
   d) positioning the cutting template of the device of step c) at the horizontal position measured in step a); and
   e) cutting the opening around the cutting template of the device.

17. A device according to claim 16, wherein in step a), the position of the electric box is measured by using a measuring plate for measuring a predetermined position of the opening, the measuring plate comprising a centered point of reference.

18. A kit for positioning and cutting an opening on a wall, the kit comprising:

a device according to claim 1; and a measuring template for measuring a predetermined position of the opening, the measuring template comprising a centered point of reference.

19. A kit according to claim 18, wherein the centered point of reference of the measuring template is an opening.

20. A kit according to claim 19, wherein the measuring template further comprises a notch at a bottom edge for creating a wiring space.

21. A kit according to claim 20, wherein the measuring template further comprises a back face having four sides, each of said side is bevelled so to allow the measuring template to fit in an electrical box in a snap-fit fashion.

22. A kit according to claim 18, wherein it further comprises a ruler.

23. A kit according to claim 22, wherein the ruler is a wallboard's ruler or a carpenter's square.

* * * * *